United States Patent [19]
Meckel et al.

[11] Patent Number: 5,710,233
[45] Date of Patent: Jan. 20, 1998

[54] POLYURETHANE ELASTOMERS WITH REDUCED GAS PERMEABILITY

[75] Inventors: Walter Meckel, Neuss; Klaus König, Odenthal; Hans-Dieter Thomas, Bergisch Gladbach, all of Germany

[73] Assignee: Rhein Chemie Rheinau GmbH, Mannheim, Germany

[21] Appl. No.: 779,198

[22] Filed: Jan. 6, 1997

Related U.S. Application Data

[63] Continuation of Ser. No. 390,212, Feb. 16, 1995, abandoned.

[30] Foreign Application Priority Data

Feb. 25, 1994 [DE] Germany ............... 44 06 158.7

[51] Int. Cl.$^6$ ............ C08G 18/46; C08G 18/60; C08G 18/32; C08L 75/06
[52] U.S. Cl. ............ 528/84; 522/60; 522/134; 522/165; 522/173; 525/424; 525/434; 525/452; 525/453; 525/454; 528/50; 528/85
[58] Field of Search ............ 528/50, 84, 85; 525/434, 452, 453, 424, 454; 522/60, 134, 165, 173

[56] References Cited

U.S. PATENT DOCUMENTS

| | | | |
|---|---|---|---|
| 2,424,884 | 7/1947 | Cook et al. | 525/424 |
| 3,230,199 | 1/1966 | Mühlhausen et al. | 528/75 |
| 3,758,631 | 9/1973 | Werner et al. | 525/424 |
| 3,935,146 | 1/1976 | Noll et al. | 528/83 |
| 4,335,231 | 6/1982 | Singh | 528/75 |
| 4,769,436 | 9/1988 | Beck et al. | 528/84 |

FOREIGN PATENT DOCUMENTS 61-255923 11/1986 Japan ............ 528/84

*Primary Examiner*—Rabon Sergent

[57] ABSTRACT

Polyurethane elastomers with reduced gas permeability are prepared by reaction of:
  a) diisocyanates,
  b) compounds with a molecular weight of 500 to 10,000 having at least two hydrogen atoms that are reactive towards isocyanates,
  c) compounds with a molecular weight of 61 to 499 having at least two hydrogen atoms that are reactive towards isocyanates, and optionally
  d) further auxiliaries and additives,
  characterized in that
    i) the ratio of the isocyanate groups in a) to the sum of the isocyanate-reactive groups in b) and c) is between 1:0.80 and 1:1.05 (isocyanate:isocyanate-reactive), and
    ii) the compound b) contains 3 to 15% by wt. of amide bonds

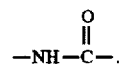

9 Claims, No Drawings

POLYURETHANE ELASTOMERS WITH REDUCED GAS PERMEABILITY

This application is a continuation of application Ser. No. 08/390,212, filed on Feb. 16, 1995, and now abandoned.

The present invention relates to polyurethane elastomers with reduced gas permeability and to a process for the preparation thereof.

Polyurethane elastomers are of constantly increasing importance in view of their good standard of properties as regards tensile strength, abrasion resistance and oil resistance. As a result of the modular-like polymer structure of long-chain polyol, chain extender and diisocyanate, said properties may also be varied on a wide scale according to requirements. The gas permeability of polyurethane elastomers is a particularly important property. It is important, for example, for the production of gas-filled suspension components in motor vehicle manufacture.

The inherently low gas permeability of polyurethane elastomers may be reduced further, in particular by fillers with a platy structure (talc, mica), in analogy with other elastomers (compare, for example, F. Leibrandt in Bayer-Mitteilungen für die Gummiindustrie no. 50, 1978, page 21 ff or R. M. Barrer, in: J. Crank and G. S. Bark, Diffusion in Polymers, page 200 to 208, Academic Press, London-New York, 1968). The introduction of such fillers makes an additional compounding step necessary, however, and often has an adverse effect on the polymer properties. For example, an increase in the hardness and a reduction in tear propagation resistance may occur.

The object was, therefore, to prepare polyurethane elastomers with further reduced gas permeability.

Said requirement is met by polyurethane elastomers which contain 3 to 15% by wt. of amide structures in the long-chain polyol. Said result is to be regarded as surprising, because a physical mixture of polyurethane elastomer and a caprolactam homopolymer does not exhibit any reduction in gas transmission.

The invention relates to polyurethane elastomers with reduced gas permeability, obtainable by reaction of:

a) diisocyanates,
b) compounds with a molecular weight of 500 to 10,000 having at least two hydrogen groups that are reactive towards isocyanates,
c) compounds with a molecular weight of 61 to 499 having at least two hydrogen atoms that are reactive towards isocyanates, and optionally
d) other auxiliaries and additives, characterised in that i) the ratio of the isocyanate groups in a) to the sum of the isocyanate-reactive groups in b) and c) is between 1:0.80 and 1:1.05 (isocyanate: isocyanate-reactive), and
ii) the compound b) contains 3 to 15% by wt. of amide bonds

The invention furthermore relates to a process for the preparation of polyurethane elastomers with reduced gas permeability, obtainable by reaction of:

a) diisocyanates,
b) compounds with a molecular weight of 500 to 10,000 having at least two hydrogen atoms that are reactive towards isocyanates,
c) compounds with a molecular weight of 61 to 499 having at least two hydrogen groups that are reactive towards isocyanates, and optionally
d) further auxiliaries and additives, characterised in that i) the ratio of the isocyanate groups in a) to the sum of the isocyanate-reactive groups in b) and c) is between 1:0.80 and 1:1.05 (isocyanate:isocyanate-reactive), and
ii) the compound b) contains 3 to 15% by wt. of amide bonds

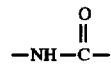

The invention furthermore relates to vulcanised polyurethane elastomers with reduced gas permeability, obtainable by reaction of:

a) diisocyanates,
b) compounds with a molecular weight of 500 to 10,000 having at least two hydrogen groups that are reactive towards isocyanates,
c) compounds with a molecular weight of 61 to 499 having at least two hydrogen groups that are reactive towards isocyanates, and optionally
d) further auxiliaries and additives, characterised in that i) the ratio of the isocyanate groups in a) to the sum of the isocyanate-reactive groups in b) and c) is between 1:0.80 and 1:1.05 (isocyanate:isocyanate-reactive), and
ii) the compound b) contains 3 to 15% by wt. of amide bonds

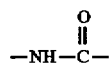

and subsequent vulcanisation of the reaction product of components a), b), c) and d) either with sulphur or with peroxides.

The invention furthermore relates to a process for the preparation of vulcanised polyurethane elastomers with reduced gas permeability by reaction of:

a) diisocyanates
b) compounds with a molecular weight of 500 to 10,000 having at least two hydrogen groups that are reactive towards isocyanates,
c) compounds with a molecular weight of 61 to 499 having at least two hydrogen groups that are reactive towards isocyanates, and optionally
d) further auxiliaries and additives, characterised in that i) the ratio of the isocyanate groups in a) to the sum of the isocyanate-reactive groups in b) and c) is between 1:0.80 and 1:1.05 (isocyanate:isocyanate-reactive), and
ii) the compound b) contains 3 to 15% by wt. of amide bonds

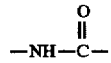

and subsequent vulcanisation of the reaction product of the component a), b), c) and d) with sulphur or with peroxides.

The polyurethane elastomers according to the invention are prepared from the following raw materials:

1. Polyisocyanates to be used according to the invention are aliphatic, cycloaliphatic, araliphatic, aromatic and heterocyclic polyisocyanates, as described e.g. by W. Siefken in Justus Liebigs Annalen der Chemie, 562, pages 75 to 136, for example, those having the formula

in which n means 2 to 4, preferably 2, and

Q means an aliphatic hydrocarbon group with 2 to 18, preferably 6 to 10 C atoms, a cycloaliphatic hydrocarbon group with 4 to 15, preferably 5 to 13 C atoms, an aromatic hydrocarbon group with 6 to 15, preferably 6 to 13 C atoms, or an araliphatic hydrocarbon group with 8 to 15, preferably 8 to 12 C atoms, e.g. polyisocyanates of the kind described in DE-OS 2 832 253, pages 10 to 11. Q may also contain heteroatoms.

As a rule, the industrially readily accessible diisocyanates are preferred, e.g. toluene 2,4- and 2,6-diisocyanate and any mixtures of said isomers ("TDI"), dicyclohexylmethane diisocyanate and diphenylmethane 4,4'-diisocyanate, diphenylmethane 2,4'-diisocyanate, hexamethylene diisocyanate and any mixtures of isomers and diisocyanates having carbodiimide groups, urethane groups, allophanate groups or urea groups ("modified diisocyanates"), particularly those modified diisocyanate that are derived from toluene 2,4- and/or 2,6-diisocyanate and from diphenylmethane 4,4'- and/or 2,4'-diisocyanate. The functionality of the isocyanates should be at least 1.8.

Diphenylmethane 4,4'-diisocyanate is particularly preferred.

2. Compounds with molecular weights between 500 and 10,000, preferably between 500 and 6,000, having at least two hydrogen groups that are reactive towards isocyanates which may come into consideration according to the invention are practically all the inherently known polyesters, polylactones, polyethers, polythioethers, polyester amides, polycarbonates, polyacetals, vinyl polymers such as, for example, polybutadiene oils, polyhydroxyl compounds already containing urethane or urea groups, optionally modified natural polyols, containing 2 and, in smaller quantities, more Zerewitinoff-active groups (essentially hydroxyl groups), and also compounds containing other Zerewitinoff-active groups such as amino-, carboxyl-, or thio groups. Said compounds belong to the state of the art and are described in detail e.g. in DE-OS 2 302 564, 2 423 764 and 2 549 372 (U.S. Pat. No. 3,963,679) and 2 402 840 (U.S. Pat. No. 3,984,607) and in DE-AS 2 457 387 (U.S. Pat. No. 4,035, 213). Hydroxyl group-containing polyesters of glycols and adipic acid, phthalic and/or terephthalic acid and hydrogenation products thereof, hydroxyl polycarbonates, polycaprolactones, polyethylene oxide, polypropylene oxide, polytetrahydrofuran and mixed polyethers of ethylene oxide and propylene oxide and/or tetrahydrofuran are preferred according to the invention.

Hydroxyl group-containing polyesters to be used in preference according to the invention are those obtainable according to inherently known processes belonging to the state of the art by melt condensation of dicarboxylic acids and/or cyclic dicarboxylic anhydrides, glycols, diamines and/or aminocarboxylic acids and cyclic acid amides thereof, the lactams.

Dicarboxylic acids which may be used are, for example: malonic acid, glutaric acid (anhydride), succinic acid (anhydride), adipic acid, sebacic acid and azelaic acid.

Aromatic dicarboxylic acids may be used jointly on a proportional basis.

Suitable diols are, for example: ethylene glycol, propylene 1,2- and 1,3-glycol, butane 1,4-diol, pentane 1,5-diol, hexane 1,6-diol, neopentyl glycol, diethylene glycol, triethylene glycol, dipropylene glycol.

Triols such as glycerol or trimethylol propane or pentaerythritol may be used jointly in a small quantity in order to bring about slight branching.

Lactams which may be used are butyrolactam, caprolactam, laurolactam.

In a preferred embodiment, adipic acid, ethylene glycol and/or butane 1,4-diol and ε-caprolactam, in an amount of 10 to 40% by wt., are reacted together, and acid values of <5, preferably <1 are achieved; the molecular weight is 1,500 to 6,000.

A content of 3 to 15% by wt. of amide bonds

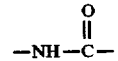

in the polyester structure is essential for the invention.

The amide group content should preferably be between 5 and 12% by wt.

Of course, it is also possible to use the amide group-containing polyesters according to the invention with a proportion of at least 50% in the mixture with the other above-mentioned compounds b) having at least 2 hydrogen atoms that are reactive towards isocyanates. The amide bond content of 3 to 15% according to the invention then relates to said mixtures.

Compounds which may be used as component c) are compounds of molecular weight 61 to 499 with a functionality of at least 1.8. Reactive groups which may be used are hydroxyl-, amino-, carboxyl- and thiol groups. Difunctional low molecular weight compounds such as dialcohols, diamines, aminoalcohols, ether and ester alcohols and dicarboxylic acids such as, for example, ethylene glycol, butane-1,4-diol and diethyltolylene diamine and its isomer mixture may be mentioned by way of example. Dialcohols are preferred. Ethylene glycol, butane-1,4 diol and 1,4-bis-(2-hydroxylethoxy)benzene are particularly preferred. If the polyurethane elastomers to be prepared have to be capable of being cross-linked by sulphur, glycerol- or trimethylolpropane monoallylethers are used.

Suitable auxiliaries and additives optionally to be used jointly are the inherently known fillers and reinforcing agents, antistatic agents, anti-ageing agents, flame retardants, dyes and pigments, plasticisers, inert solvents, slip agents and other processing auxiliaries, release agents, catalysts of both an inorganic and/or organic nature, of the kind belonging to the state of the art.

If the elastomers are to be vulcanised at a later stage, activators such as, for example, trisallylcyanurate and peroxides such as, for example, tert.-butylamyl peroxide or sulphur are to be incorporated in the polyurethane elastomers by means of suitable mixing units such as, for example, rollers or kneaders.

Carrying out the process according to the invention a) Preparation of the amide group-containing polyesters The preparation of the amide group-containing polyesters takes place by melt condensation of dicarboxylic acids, glycols and diamines and/or aminocarboxylic acids and cyclic acid amides thereof, the lactams. All the starting compounds are charged together and are condensed in the melt at 150° C. to 250° C., with distillation of the water of reaction.

Towards the end of the reaction, the escape of water is facilitated by applying reduced pressure, by means of a propellant or an entrainer. Esterification may be accelerated by means of inherently known esterification catalysts. The three components are used in a ratio such that, on the one hand, the desired amide group content is obtained and, on the other hand, after reaction of the acid groups, the desired OH group content is obtained.

b) Preparation of the polyurethane elastomers according to the invention

The preparation of the polyurethane elastomers according to the invention takes place by mixing components a), b), c) and d) together and stirring at elevated temperature, by mixing with the aid of mixing equipment, for example, mixing heads, and subsequent introduction into a mould or a reaction extruder.

A reaction in solution, for example in toluene or methyl-ethylketone followed by separation of the solvent is, however, also possible.

The hardness of the resulting elastomers is determined by the ratio of the components b) to c). For soft products, 0.2 to 1.0 mole of component c) per mole of component b) is used, whilst for rigid products 2.0 to 4.0 mole of component c) per mole of component b) is used.

The ratio of the isocyanate groups of component a) to the sum of the hydroxyl groups of component b) and c) is 1:0.80 to 1:1.05, preferably 1:0.95 to 1:1.02.

The resulting elastomers are solids which, by means of inherently known processing methods such as extrusion, injection moulding, dissolution in solvents and subsequent impregnation or coating of carrier materials, lead to highly abrasion-resistant, oil-resistant moulded bodies with low gas permeability.

The polyurethane elastomers prepared may, however, also be vulcanised like a rubber. Said vulcanisation takes place in an inherently known way, either by the use of peroxides or sulphur under hot conditions with simultaneous or successive mixing and forming.

The moulded bodies produced according to the process of the invention are suitable for structural parts that are required to have a particular abrasion resistance and oil resistance, and a low gas permeability. They are therefore particularly suitable as components of gas-filled suspension elements.

EXAMPLES

Preparation of the amide group-containing polyester polyols

Polyol I 2207 g (35.6 mole) of ethylene glycol, 4614 g (31.6 mole) of adipic acid and 2000 g of ε-caprolactam are melted in a 10 l four-necked flask with contact thermometer, nitrogen inlet, stirrer and short packed column and heated under nitrogen. Water of condensation begins to be distilled off from 150° C. Over the course of 5 hours, the temperature is raised to 200° C. with continuous distillation of water and left at that level until distillation ceases. 200 mg of $SnCl_2.2H_2O$ are now introduced and the pressure is reduced to 15 mbar over the course of 3 hours with further distillation of water. After a further 12 hours under these conditions, condensation has ended (acid value: 0.4). A viscous, yellow oil of OH number 54.4 with an amide group content of 9.9% is obtained.

Polyol II

An amide group-containing polyester polyol with the following data is obtained according to the same method as polyol I from 1273 g of ethylene glycol, 2786 g of adipic acid and 1200 g of ε-caprolactam:

acid value 0.4

OH number: 31 amide group content: 10.0%

Polyol III

An amide group-containing polyester polyol with the following data is obtained according to the same method as polyol I from 2570 g of ethylene glycol, 5665 g of adipic acid and 1200 g of ε-caprolactam:

acid value: 0.6

OH number: 24.8

Amide group content: 5.7%

Preparation of polyurethane elastomers

Example 1

1940 g (1 mole) of polyol I are dehydrated with 79.2 g (0.4 mole) of 1,4-bis-(2-hydroxyethoxy) benzene at 80° C. in a water jet vacuum and subsequently mixed with intensive stirring with 350 g (1.4 mole) of diphenylmethane 4,4'-diisocyanate (MDI). After 1 minute the 130° C. melt is poured into a Teflon dish and heat-treated at 100° C. for 12 hours (amide group content of the elastomer: 8.1%).

Example 2

Example 2 is carried out according to the same recipe as example 1, but the reaction is carried out with a solids concentration of 40% in boiling toluene. Solvent is removed from the highly viscous solution by distilling off the toluene.

Example 3

The following are processed according to the specification of example 1:

| | |
|---|---|
| 3620 g (1 mole) | polyol II |
| 79.2 g (0.4 mole) | 1,4-bis-(2-hydroxyethoxy) benzene |
| 350 g (1.4 mole) | diphenylmethane 4,4'-diisocyanate |

Amide group content of the elastomer: 8.9%.

Example 4

The following are processed according to the specification of example 1:

| | |
|---|---|
| 4500 g (1 mole) | polyol III |
| 79.2 g (0.4 mole) | 1,4-bis-(2-hydroxyethoxy) benzene |
| 350 g (1.4 mole) | diphenylmethane 4,4'-diisocyanate |

Amide group content of the elastomer: 5.2%.

Example 5

The following are processed according to the specification of example 1:

| | |
|---|---|
| 1940 g (1 mole) | polyol I |
| 225 g (2.5 mole) | butane 1,4-diol |

| 918.7 g (3.675 mole) | diphenylmethane 4,4'-diisocyanate |

Amide group content of the elastomer: 6.2%.

Example 6

The following are processed according to the specification of example 1:

| 1940 g (1 mole) | polyol I |
| 396 g (2 mole) | 1,4-bis-(2-hydroxyethoxy) benzene |
| 787.5 g (3.5 mole) | diphenylmethane 4,4'-diisocyanate |

Amide group content of the elastomer: 6.1%

Comparative Examples

Example 5A

The following are processed according to the specification of example 1:

| 2250 g (1 mole) | adipic acid butane diol polyester (OH number 50; acid value 0.6) |
| 225 g (2.5 mole) | butane 1,4-diol |
| 875 g (3.5 mole) | diphenylmethane 4,4'-diisocyanate |

Amide group content of the elastomer: 0%

Example 1A

The following were processed according to the specification of example 1:

| 2000 g (1 mole) | adipic acid ethylene glycol propylene 1,2-glycol polyester (OH number 56; acid value 0.7) |
| 36 g (0.4 mole) | butane 1,4-diol |
| 350 g (1.4 mole) | diphenylmethane 4,4'-diisocyanate |

Amide group content of the elastomer: 0%.

Example 1B 80 parts of the elastomer from example 1A are homogenised with 20 parts of a caprolactam homopolymer (Durethan® from Bayer AG) by means of an extruder at 180° C. (Amide group content: 7.6%)

Processing of the polyurethane elastomers

The polyurethane elastomers according to example 1, 2, 3, 4, 1A and 1B are mixed with the given additives in a cylinder mill from Werner & Pfleiderer and the crude mixture is processed with forming and vulcanisation for 30 minutes at 160° C. to test slabs 2 mm thick.

The polyurethane elastomers 5, 6 and 5A are pressed in a heated press for 5 minutes at 190° C. to test slabs 3 mm thick.

The values measured on the test slabs for tensile strength, elongation at break, hardness and nitrogen transmission are summarised in Table I.

TABLE I

| Polyurethane elastomer according to example | 1 | 2 | 3 | 4 | 5 | 6 | 1A | 1B | 5A |
| --- | --- | --- | --- | --- | --- | --- | --- | --- | --- |
| g polyurethane elastomer | 100 | 100 | 100 | 100 | 100 | 100 | 100 | 100 | 100 |
| g stearic acid | 0.5 | 0.5 | 0.5 | 0.5 | | | 0.5 | 0.5 | |
| g Stabaxol PCD ® | 1.5 | 1.5 | 1.5 | 1.5 | | | 1.5 | 1.5 | |
| g Corax N 550 ® | 2 | 2 | 2 | 2 | | | 2 | 2 | |
| g TAC ® | 0.5 | 0.5 | 0.5 | 0.5 | | | 0.5 | 0.5 | |
| g Trigonox T50D ® | 5 | 5 | 5 | 5 | | | 5 | 5 | |
| 30' 160° C. | x | x | x | x | | | x | x | |
| 5' 190° C. | | | | | x | x | | | x |
| Tensile strength [(MPa)] | 22.4 | 23.6 | 16.3 | 22.0 | 22.0 | 21.4 | 23.0 | 29.2 | 36.6 |
| Elongation at break [(%)] | 455 | 480 | 540 | 460 | 380 | 420 | 510 | 175 | 570 |
| Shore hardness A | 60 | 63 | 50 | 61 | 83 | 80 | 74 | 88 | 84 |
| $N_2$ gas transmission for 1 mm slab thickness | 87 | 100 | 97 | 168 | 12 | 13 | 194 | 195 | 50 |

$$\left[ \frac{cm^3}{m^2 \times 24\, h \times bar} \right]$$

We claim:

1. Polyurethane elastomers with reduced gas permeability obtained by reaction of a mixture consisting of:
   a) diisocyanates,
   b) compounds with a molecular weight of 500 to 10,000 having at least two hydrogen groups that are reactive towards isocyanates,
   c) compounds with a molecular weight of 61 to 499 having at least two hydrogen groups that are reactive towards isocyanates, and optionally,
   d) additives,
   characterised in that
   i) the ratio of the isocyanate groups in a) to the sum of the isocyanate-reactive groups in b) and c) is between 1:0.80 and 1:1.05 (isocyanate:isocyanate-reactive),
   ii) the compound b) is a polyester polyol prepared by forming a reactant mixture consisting of adipic acid, ethylene glycol and ε-caprolactam, wherein the reactant mixture contains 10 to 40% by wt. of ε-caprolactam, and then reacting the adipic acid with the ethylene glycol and the ε-caprolactam, said polyester polyol containing 3 to 15% by wt., based on the weight of compound b), of amide bonds

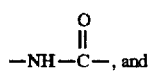

iii) the component d) is at least one material selected from the group consisting of fillers, antistatic agents, anti-ageing agents, flame retardants, pigments, plasticizers, inert solvents, slip agents, inorganic catalysts and organic catalysts.

2. Polyurethane elastomers according to claim 1, wherein said fillers are reinforcing agents.

3. Polyurethane elastomers according to claim 1, wherein said pigments are dyes.

4. Polyurethane elastomers according to claim 1, wherein said slip agents are release agents.

5. Polyurethane elastomers according to claim 4, wherein component d) is at least one material selected from the group consisting of fillers, antistatic agents, flame retardants, plasticizers and release agents.

6. Polyurethane elastomers with reduced gas permeability obtained by reaction of a mixture consisting of:
   (a) diisocyanates,
   (b) compounds with a molecular weight of 500 to 10,000 having at least two hydrogen groups that are reactive towards isocyanates,
   (c) compounds with a molecular weight of 61 to 499 having at least two hydrogen groups that are reactive towards isocyanates, and optionally,
   (d) additives,
   characterised in that
   i) the ratio of the isocyanate groups in a) to the sum of the isocyanate-reactive groups in b) and c) is between 1:0.80 and 1:1.05,
   ii) the compound b) is a polyester polyol prepared by forming a reactant mixture consisting of adipic acid, butane 1,4-diol and ε-caprolactam, and then reacting the adipic acid with the butane 1,4-diol and the ε-caprolactam, said polyester polyol containing 3 to 15% by wt., based on the weight of compound b), of amide bonds

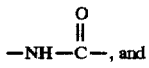

iii) the component d) is at least one material selected from the group consisting of fillers, antistatic agents, anti-ageing agents, flame retardants, pigments, plasticizers, inert solvents, slip agents, inorganic catalysts and organic catalysts.

7. A process for the preparation of polyurethane elastomers with reduced gas permeability by reaction of a mixture consisting of:
   a) diisocyanates,
   b) compounds with a molecular weight of 500 to 10,000 having at least two hydrogen groups that are reactive towards isocyanates,
   c) compounds with a molecular weight of 61 to 499 having at least two hydrogen groups that are reactive towards isocyanates, and optionally,
   d) additives,
   characterised in that
   i) the ratio of the isocyanate groups in a) to the sum of the isocyanate-reactive groups in b) and c) is between 1:0.80 and 1:1.05 (isocyanate:isocyanate-reactive),
   ii) the compound b) is a polyester polyol prepared by forming a reactant mixture consisting of adipic acid, ethylene glycol and ε-caprolactam, wherein the reactant mixture contains 10 to 40% by wt. of ε-caprolactam, and then reacting the adipic acid with the ethylene glycol and the ε-caprolactam, said polyester polyol containing 3 to 15% by wt., based on the weight of compound b), of amide bonds

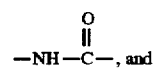

iii) the component d) is at least one material selected from the group consisting of fillers, antistatic agents, anti-ageing agents, flame retardants, pigments, plasticizers, inert solvents, slip agents, inorganic catalysts and organic catalysts.

8. Vulcanized polyurethane elastomers with reduced gas permeability obtained by reaction of a mixture consisting of:
   a) diisocyanates,
   b) compounds with a molecular weight of 500 to 10,000 having at least two hydrogen groups that are reactive towards isocyanates,
   c) compounds with a molecular weight of 61 to 499 having at least two hydrogen groups that are reactive towards isocyanates, and optionally,
   d) additives,
   characterised in that
   i) the ratio of the isocyanate groups in a) to the sum of the isocyanate-reactive groups in b) and c) is between 1:0.80 and 1:1.05 (isocyanate:isocyanate-reactive),
   ii) the compound b) is a polyester polyol prepared by forming a reactant mixture consisting of adipic acid, ethylene glycol and ε-caprolactam, wherein the reactant mixture contains 10 to 40% by wt. of ε-caprolactam, and then reacting the adipic acid with the ethylene glycol and the ε-caprolactam, said polyester polyol containing 3 to 15% by wt., based on the weight of compound b), of amide bonds

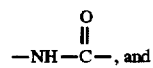

iii) the component d) is at least one material selected from the group consisting of fillers, antistatic agents, anti-ageing agents, flame retardants, pigments, plasticizers, inert solvents, slip agents, inorganic catalysts and organic catalysts, and subsequent vulcanization of the reaction product of components a), b), c) and d) either with sulphur or peroxides.

9. A process for the preparation of vulcanized polyurethane elastomers with reduced gas permeability by reaction of a mixture consisting of:
   a) diisocyanates,
   b) compounds with a molecular weight of 500 to 10,000 having at least two hydrogen groups that are reactive towards isocyanates,
   c) compounds with a molecular weight of 61 to 499 having at least two hydrogen groups that are reactive towards isocyanates, and optionally,
   d) additives,
   characterised in that
   i) the ratio of the isocyanate groups in a) to the sum of the isocyanate-reactive groups in b) and c) is between 1:0.80 and 1:1.05 (isocyanate:isocyanate-reactive), ii) the compound b) is a polyester polyol prepared by forming a reactant mixture consisting of adipic acid, ethylene glycol and ε-caprolactam, wherein the reactant mixture contains 10 to 40% by wt. of ε-caprolactam, and then reacting the adipic acid with the ethylene glycol and the ε-caprolactam, said polyester polyol containing 3 to 15% by wt., based on the weight of compound b), of amide bonds

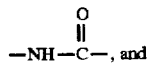, and iii) the component d) is at least one material selected from the group consisting of fillers, antistatic agents, anti-ageing agents, flame retardants, pigments, plasticizers, inert solvents, slip agents, inorganic catalysts and organic catalysts, and subsequent vulcanization of the reaction product of components a), b), c) and d) either with sulphur or peroxides.

* * * * *

UNITED STATES PATENT AND TRADEMARK OFFICE
CERTIFICATE OF CORRECTION

PATENT NO. : 5,710,233
DATED : January 20, 1998
INVENTOR(S) : Meckel, et al

It is certified that error appears in the above-indentified patent and that said Letters Patent is hereby corrected as shown below:

On the cover page, in section [57] ABSTRACT, in paragraphs b) and c); the word "atoms" should be --groups--.

Signed and Sealed this

Eighteenth Day of August, 1998

Attest:

BRUCE LEHMAN

Attesting Officer      Commissioner of Patents and Trademarks